(12) United States Patent
Kataoka (10) Patent No.: US 7,079,048 B2
(45) Date of Patent: Jul. 18, 2006

(54) MOBILE COMMUNICATION UNIT

(75) Inventor: Eiji Kataoka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 178 days.

(21) Appl. No.: 10/881,443

(22) Filed: Jun. 30, 2004

(65) Prior Publication Data

US 2004/0266458 A1    Dec. 30, 2004

(30) Foreign Application Priority Data

Jun. 30, 2003    (JP)    ............................ P.2003-186733

(51) Int. Cl.
*G08G 1/09*    (2006.01)
(52) U.S. Cl. .............. 340/905; 340/539.11; 340/539.2; 701/211; 455/414.3
(58) Field of Classification Search ................ 340/905, 340/539.1, 539.11, 539.2, 539.28; 701/211; 455/414.3
See application file for complete search history.

(56) References Cited

U.S. PATENT DOCUMENTS

| | | | |
|---|---|---|---|
| 6,091,956 A * | 7/2000 | Hollenberg .............. | 455/456.5 |
| 6,288,704 B1 * | 9/2001 | Flack et al. .................. | 345/158 |
| 6,636,801 B1 * | 10/2003 | Curbow ...................... | 701/207 |
| 6,788,954 B1 * | 9/2004 | Watanabe ................ | 455/550.1 |
| 6,947,839 B1 * | 9/2005 | Uotani ....................... | 701/210 |
| 6,988,036 B1 * | 1/2006 | Sakai et al. ................ | 701/209 |
| 2003/0009281 A1 * | 1/2003 | Whitham .................... | 701/211 |

FOREIGN PATENT DOCUMENTS

JP    2002-374515    12/2002

* cited by examiner

*Primary Examiner*—Toan N. Pham
(74) *Attorney, Agent, or Firm*—Hogan & Hartson LLP

(57) ABSTRACT

A mobile communications terminal receives information based on a location and time at regular time intervals. To acquire information, an input section accepts setting input from the user and stores the setting in a specified information storage section. An acquisition request control section sends an instruction to a practical information acquisition section at regular time intervals, and the practical information acquisition section acquires the user's desired information from an external server based on the instruction. A display section displays the acquired information according to a predetermined display mode.

12 Claims, 12 Drawing Sheets

| ID 254 | LOCATION 256 | TIME 258 | TYPE 260 | DISPLAY MODE 262 | ACQUISITION INTERVALS 264 | SETTING 268 |
|---|---|---|---|---|---|---|
| 1 | CURRENT POSITION | 1 HOUR LATER | WEATHER | LED | 30 MINUTES | ON |
| 2 | DAIKANYAMA STATION | 1 HOUR LATER | WEATHER | PICTOGRAPHY | 30 MINUTES | OFF |
| 3 | HOME | 1 HOUR LATER | WEATHER | WALLPAPER | 1 HOUR | OFF |
| 4 | OFFICE | 10 HOURS LATER | TEMPERATURE | LED | 3 HOURS | OFF |
| 5 | CURRENT POSITION | 1 WEEK LATER | POLLEN | PICTOGRAPHY | 5 HOURS | OFF |
| 6 | CURRENT POSITION | 2 HOURS LATER | WEATHER | PICTOGRAPHY | 1 HOUR | OFF |
| 7 | CURRENT POSITION | 5 HOURS LATER | TYPHOON | LED | 5 HOURS | OFF |
| 8 | HOME | 1 DAY LATER | WEATHER | PICTOGRAPHY | 12 HOURS | OFF |
| ...... | | | | | | |

WEATHER FORECAST: CODE 001

| REGION CODE | | TIME CODE | | WEATHER CODE | |
|---|---|---|---|---|---|
| 01 | TOKYO (EAST) | (TODAY) | 0:00–1:00 | 001 | 01 | SUNNY |
| 02 | TOKYO (WEST) | (TODAY) | 1:00–2:00 | 002 | 02 | CLOUDY |
| 03 | KANAGAWA | ......... | ......... | 03 | RAIN |
| 04 | CHIBA | (TODAY) | 23:00–24:00 | 024 | 04 | SNOW |
| 05 | SAITAMA | (TOMORROW) | 0:00–1:00 | 025 | 05 | SLIGHT CLOUDY |
| 06 | IBARAKI | ......... | ......... | ......... |
| 07 | TOCHIGI | | | |
| 08 | GUNMA | | | |

| NUMBER OF REQUEST | ID | REGION CODE | TIME CODE | CONTENTS CODE | ID | REGION CODE | TIME CODE |
|---|---|---|---|---|---|---|---|
| 2 | 01 | 01 | 024 | 001 | 09 | 04 | 036 |

| NUMBER OF RESPONSES | ID | REGION CODE | TIME CODE | CONTENTS CODE | WEATHER CODE | ID |
|---|---|---|---|---|---|---|
| 2 | 01 | 01 | 024 | 001 | 03 | 02 |

MOBILE COMMUNICATION UNIT

BACKGROUND OF THE INVENTION

1. Field of the Invention

The invention relates to an art for acquiring information through a mobile communications terminal, and in particular to an art for acquiring information based on a location and time at regular time intervals.

2. Description of the Related Art

In recent years, radio communication networks for various mobile communication units such as portable telephones, car phones, and personal handyphones have been rapidly built. The radio communication networks with rapidly expanded service areas in the form of being connected to a conventional wire telephone network have become a social infrastructure.

At present, a portable telephone has an Internet connection function and an advanced information processing function. As a result, the portable telephone has evolved into an integrated information communication terminal beyond the confines of simple communication means. This also applies to most of mobile communication terminals other than the portable telephone.

JP-A-2002-374515 is referred to as a related art.

In order to access the Internet with a portable telephone so that a user of the portable telephone acquires any desired information, usually it is necessary to start an Internet browser for connecting the portable telephone to a predetermined contents distribution server. However, such a procedure is not necessarily the most suitable user interface so as to acquire various information with such a procedure.

SUMMARY OF THE INVENTION

An object of the invention is to provide a mobile communication unit which is able to acquire desired information effectively.

The invention provides a mobile communication unit including an input section which accepts operation by a user of the mobile communication unit; a display section which displays predetermined information; a specified information storage section which every setting stores a specified time specified through the input section and a specified location; a practical information acquisition section which requests desired practical information based on the specified time and the specified location to a server storing practical information which varies on location and is updated with the lapse of time, so as to acquire the desired practical information; an acquisition request control section which controls the practical information acquisition section to request the desired practical information at regular time intervals; and a display control section which controls the display section to display the desired practical information that the practical information acquisition section acquires.

A "mobile communication unit" refers to a unit that can perform a communication function even while the unit itself moves. It is mainly a radio communication unit; for example, it may be a portable telephone, a PDA (personal digital assistant), etc., or may be a car navigation terminal. The "display section " refers to a unit having a function of displaying information for the user even while a telephone call and the like are not in progress. It is not limited to a screen display but may be a display means such as an LED (light Emitting Diode) provided on a housing of a portable telephone, for example.

Furthermore, the mobile communication unit involves a current position acquisition section which acquires the current position of the mobile communication unit, wherein the specified information storage section stores the current position that the current position acquisition section acquires as the specified location. Otherwise, the specified location is a position specified through the input section.

Furthermore, a specified information storage section stores type information representing contents type of practical information, and the practical information acquisition section requests desired practical information corresponding to the type information.

The "contents type" means the type of practical information to be acquired, that is, the category of contents themselves. It does not mean a category based on the information result or prerequisite. For example, "weather forecast" is one of the contents type of practical information, but information of "sunny" or "rainy" is information representing the result in the contents of "weather forecast." Therefore, these information representing the result in contents are not included in the "contents type" mentioned here. The category based on the time, the location, etc., such as "weather three hours later" and "weather in Tokyo" is information as a prerequisite for the contents of "weather forecast" and is only a parameter. Therefore, these information as a prerequisite for contents is not also included in the "contents type" mentioned here.

Furthermore, the specified information storage section stores display setting information representing a display mode of displaying the desired practical information every setting, and the display control section controls the display section to display the desired practical information according to the display mode information with reference to the specified information storage section.

Furthermore, the acquisition request control section controls to change the regular time interval according to whether it is in daytime or nighttime.

Furthermore, the display control section controls the display section to change an aspect of what is displayed according to a result of an acquired practical information.

Furthermore, the display control section controls the display section to change an aspect of what is displayed when contents of an acquired practical information changes from contents of practical information acquired at a previous time interval.

Furthermore, the mobile communication unit involves an alerting section which alerts a user of the mobile communication unit to a result of an acquired practical information.

Furthermore, the mobile communication unit involves an alerting section which alerts a user of the mobile communication unit when contents of an acquired practical information changes from contents of practical information acquired at a previous time interval.

The invention also provides a communication system, including a mobile communication unit in a mobile communication network; and a contents server connected to the mobile communication network, which stores practical information which varies on location and is updated with the lapse of time, wherein the mobile communication unit requests at regular time intervals to the contents server desired practical information based on a specified time and a specified location, the contents server transmits the desired practical information in response to the request by the mobile communication unit, and the mobile communication unit display the desired practical information transmitted by the contents server.

The invention also provides a method of acquiring desired practical information from a contents server to a mobile communication unit in a mobile communication network, involving the steps of storing in the contents server practical information which varies on location and is updated with the lapse of time; requesting from the mobile communication unit to the contents server desired practical information based on a specified time and a specified location; transmitting from the contents server to the mobile communication unit the desired information in response to the request from the mobile communication unit; and displaying in the mobile communication unit the desired practical information transmitted from the contents server.

Conversation of any desired combination of the components described above and the representation of the invention among methods, units, systems, record media, computer programs, etc., is also effective as an aspect of the invention.

DETAILED DESCRIPTION OF THE PREFERRED EMBODIMENTS

Figure 1:
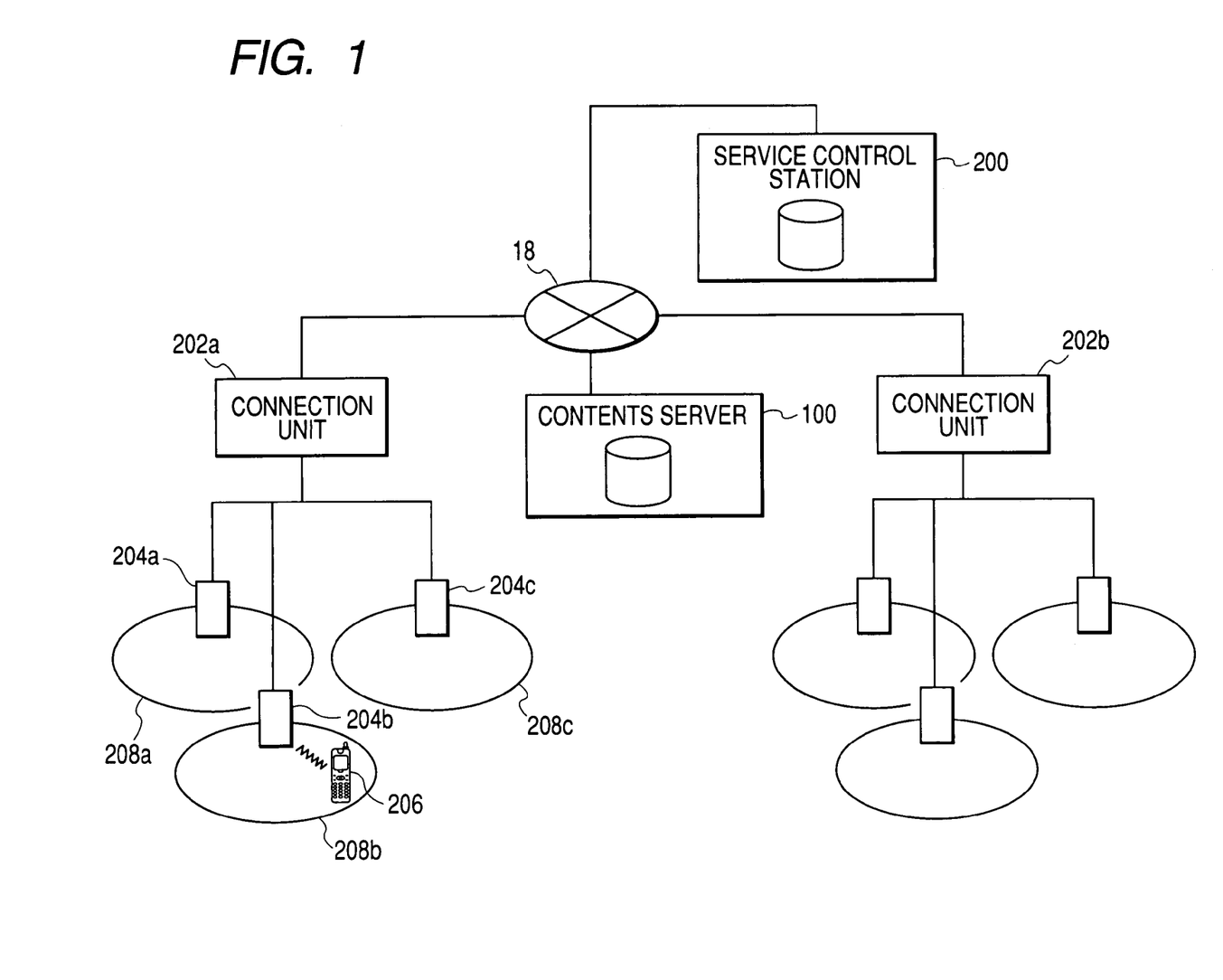
FIG. 1 is a drawing to show a configuration of a mobile communication system in an embodiment of the invention.

FIG. 1 shows a configuration of a mobile communications system. A contents server 100 is a server for providing a mobile communications unit 206 with various information. A plurality of connection units such as connection units 202a and 202b, which will be hereinafter also collectively called "connection units 202," are connected to a radio communication network 18. The connection unit 202a links a plurality of base stations such as base stations 204a, 204b, and 204c, which will be hereinafter also collectively called "base stations 204," to the radio communication network 18. The base stations 204a, 204b, and 204c take charge of cell areas 208a, 208b, and 208c respectively, which will be hereinafter also collectively called "cell areas 208." The mobile communication unit 206 connects to the base station 204 taking charge of the cell area 208 to which the mobile communication unit 206 belongs, thereby makes communications to acquire any desired information from the contents server 100.

The mobile communication unit 206 receives the base station identification number (hereinafter called "base station ID") transmitted from the base station 204b so that the mobile communication unit 206 knows which of base stations 204 the mobile communication unit 206 connects to. The mobile communication unit 206 writes the identification number of the mobile communication unit 206 together with the received base station ID onto a service control station 200 through the base station 204b, the connection unit 202a, and the radio communication network 18. Then, the service control station 200 stores information about which of cell areas 208 the mobile communication unit 206 belongs to at present and which of base station 204 the mobile communication unit 206 connects to at present.

An embodiment of the invention will be explained by taking the process of acquiring weather forecast information by a portable telephone as an example. To begin with, an outline of the invention, mainly a user interface screen, will be explained and then its specific implementation method will follow.

First, a screen for making setting to acquire weather forecast information at regular time intervals will be explained.

Figure 2:
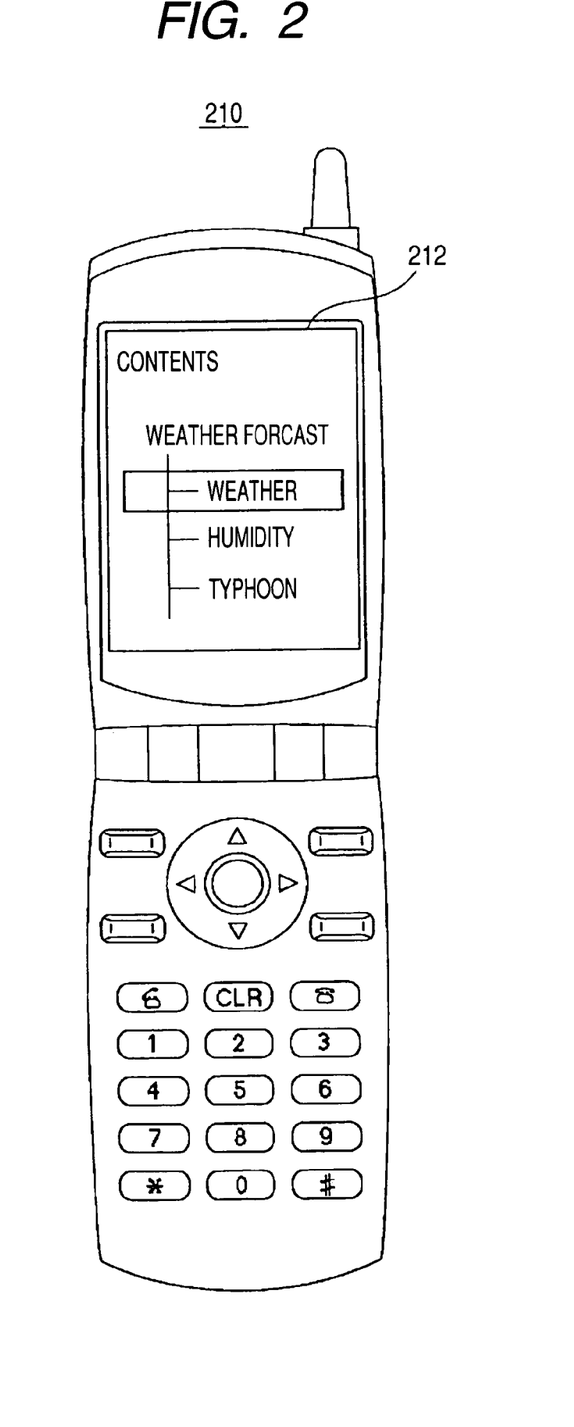
FIG. 2 is a drawing to show an example of a screen for setting the type of practical information.

FIG. 2 shows a practical information type setting screen 212 for the user to select they type of practical information to be acquired in a portable telephone 210. In the figure, the user selects "WEATHER" contained in the "WEATHER FORECAST" category as the practical information to be acquired. The weather information includes various information such as information concerning humidity and that concerning typhoon as shown in FIG. 2.

Figure 3:
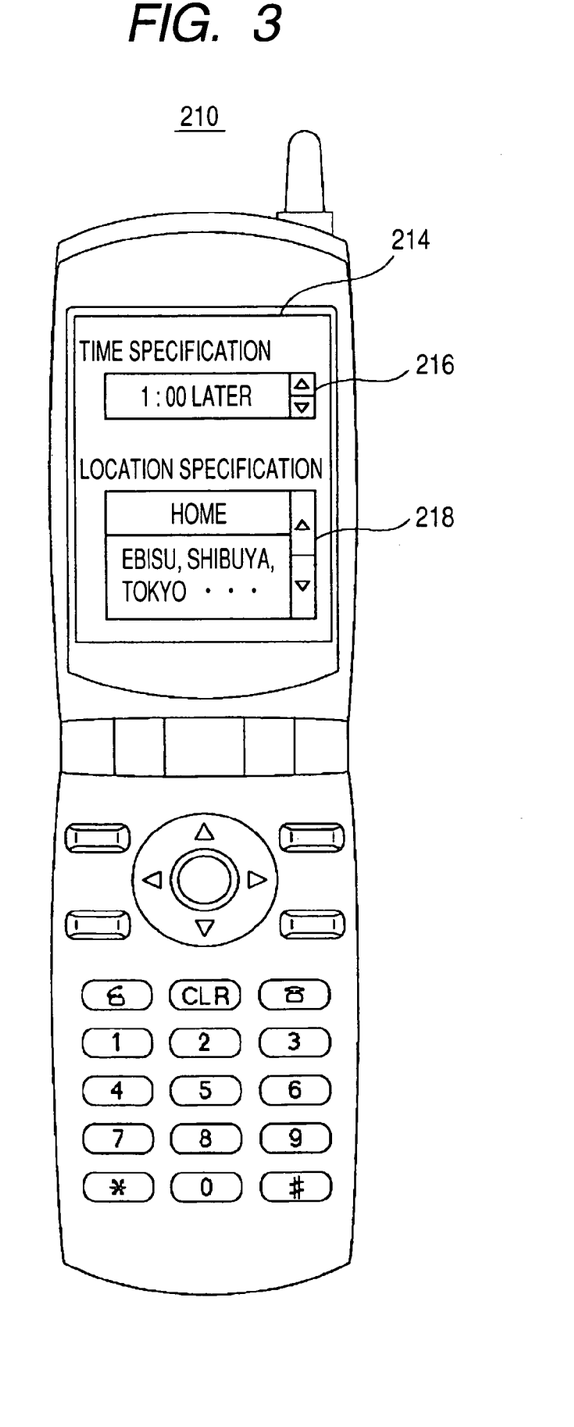
FIG. 3 is a drawing to show an example of a screen for setting the time and location for practical information.

FIG. 3 shows a condition setting screen 214 for the user to specify the time and the location as prerequisites for weather forecast information in the portable telephone 210. In FIG. 3, weather forecast "ONE HOUR LATER" is set in a time setting area 216. Weather forecast on the periphery of "HOME" is set in a location setting area 218. Then, the user sets a display mode of displaying the acquired weather forecast information on a display mode setting screen (not shown). The user may set the time intervals at which the portable telephone 210 periodically acquires the specified weather forecast information, which will be hereinafter called "acquisition interval." When the settings are registered in the portable telephone 210, the portable telephone 210 periodically accesses the contents server 100 having weather forecast information to acquire the corresponding information in accordance with the settings.

A weather forecast information display interface will be explained.

Figure 4:
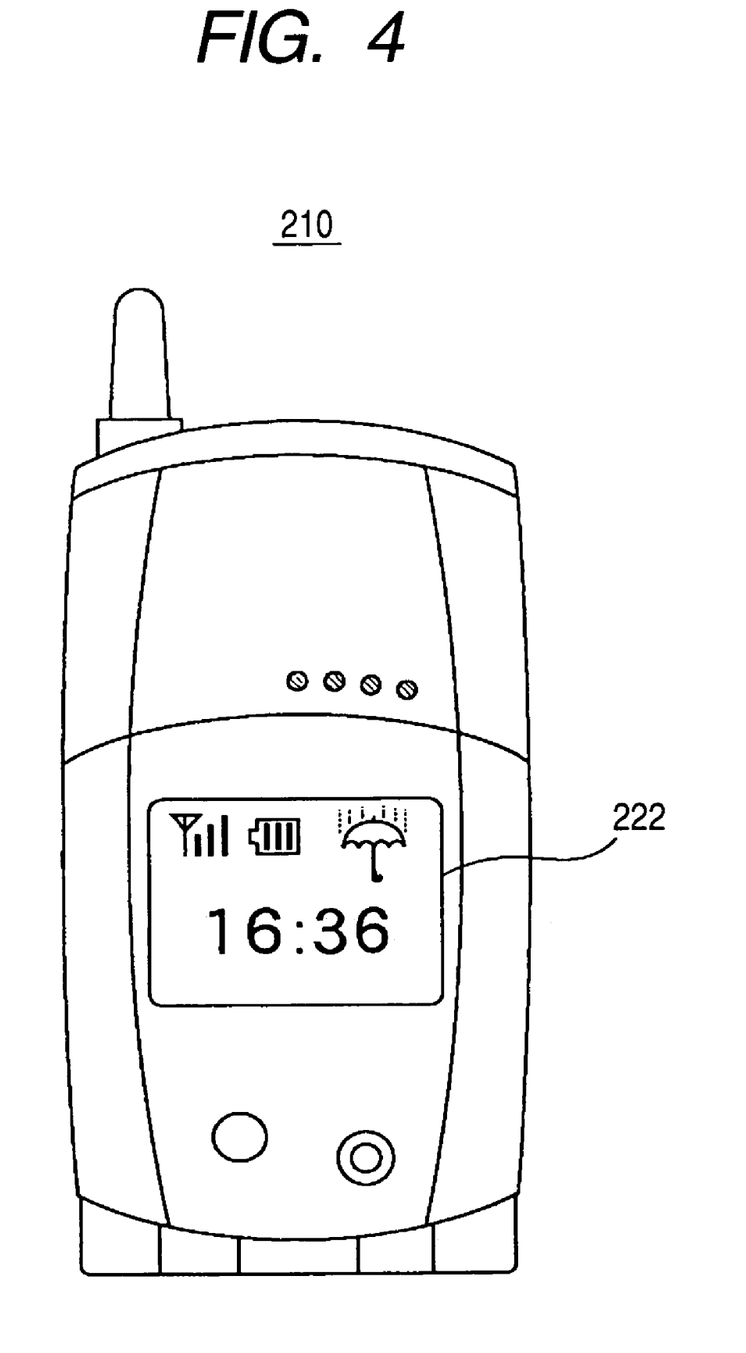
FIG. 4 is a drawing to show a mode of pictographic display of practical information.

FIG. 4 is a drawing to show a mode in which the weather forecast information set in FIGS. 2 and 3 is displayed on the condition that the portable telephone 210 is folded. In FIG. 4, an umbrella mark is displayed on a subscreen 222. The umbrella mark makes the user know that "it will rain in the vicinity of the user's home one hour later." Since the weather forecast information one hour later is acquired at regular time intervals, the user can always know weather forecast in the vicinity of the user's home in one hour after the current time. Hereinafter, display using such an iconified mark in a part of the screen will be called "pictographic display."

Figure 5:
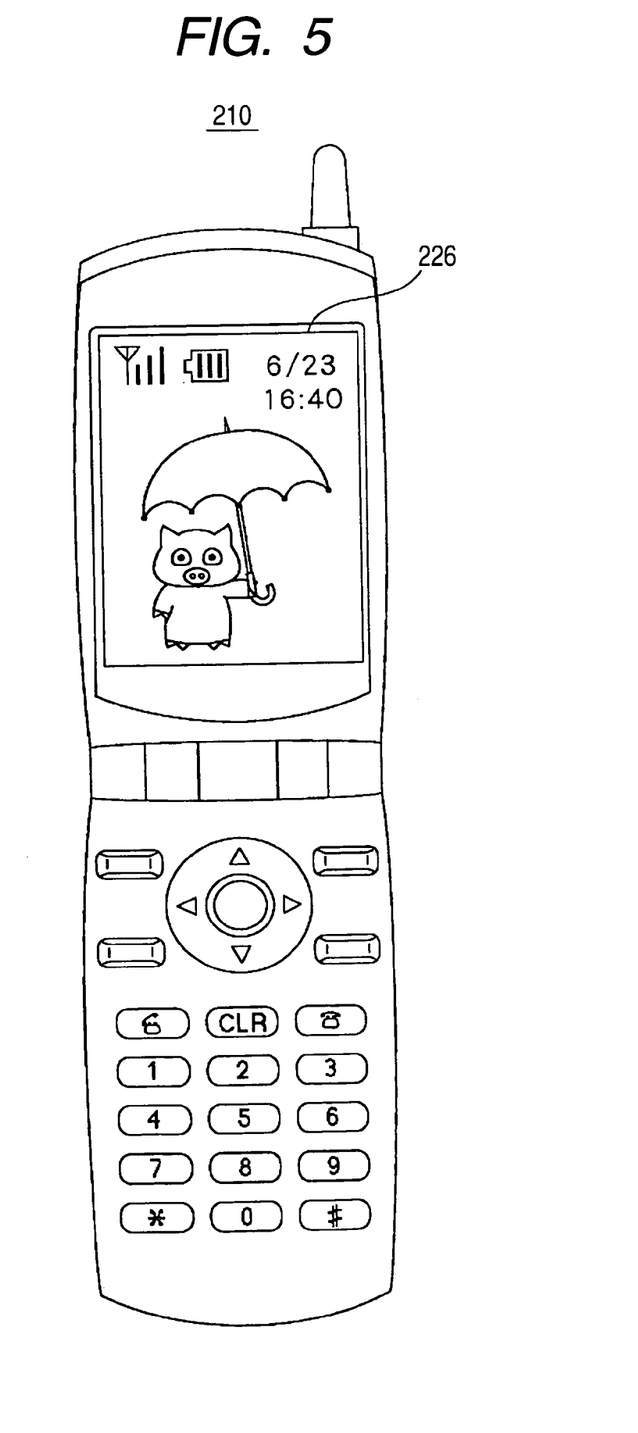
FIG. 5 is a drawing to show a mode of wallpaper display of practical information.

FIG. 5 is a drawing to show a mode in which the weather forecast information is displayed on the condition that the portable telephone 210 is unfolded. In FIG. 5, a character, a pig holding an umbrella, is displayed as wallpaper of a main screen 226. This display enables the user to always know weather forecast in the vicinity of the user's home in one hour like the subscreen 222 does as shown in FIG. 4.

Figure 6:
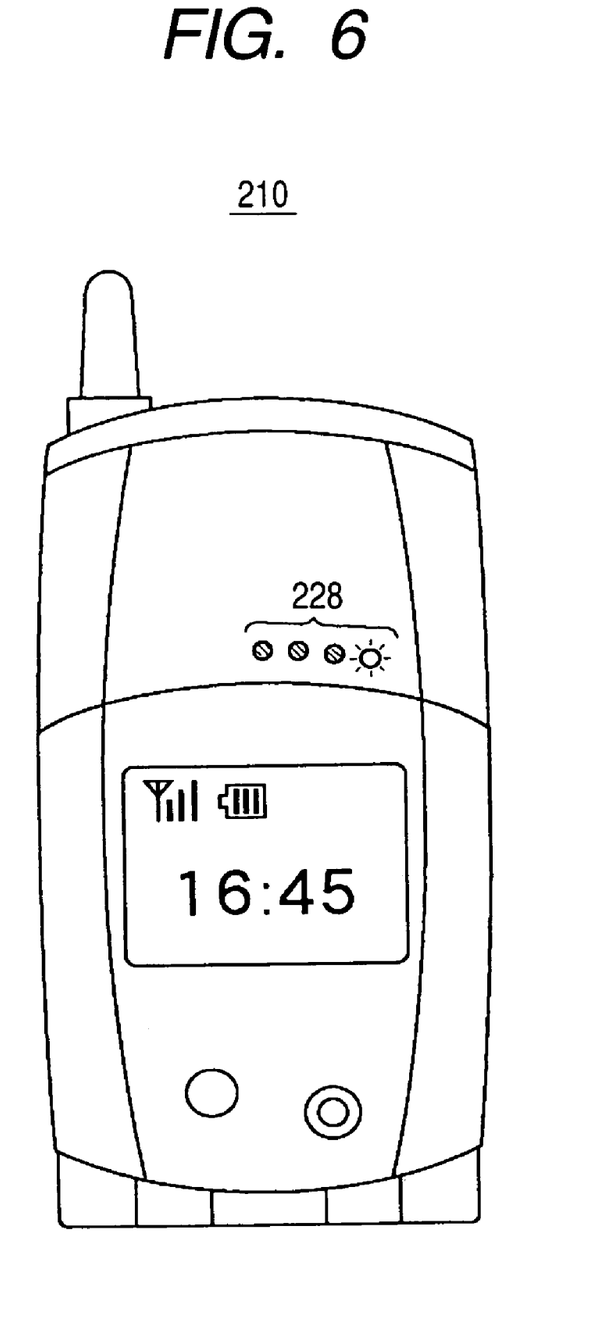
FIG. 6 is a drawing to show a mode of LED display of practical information.

FIG. 6 is a drawing to show another mode in which the weather forecast information is indicated on the condition that the portable telephone 210 is folded. An LED group 228 includes four LEDs (Light Emitting Diodes). Any one of four LEDs illuminates according to the weather forecast information. The indication by LED may be performed in different colors of the LED, illumination patterns, or in a combination of these. Hereinafter, such information display using the LEDs will be called "LED display."

The pictographic display shown in FIG. 4, the wallpaper display shown in FIG. 5 and the LED display shown in FIG. 6 do not depend on whether or not the portable telephone 210 is folded. The display modes may be used in combination.

Figure 7:
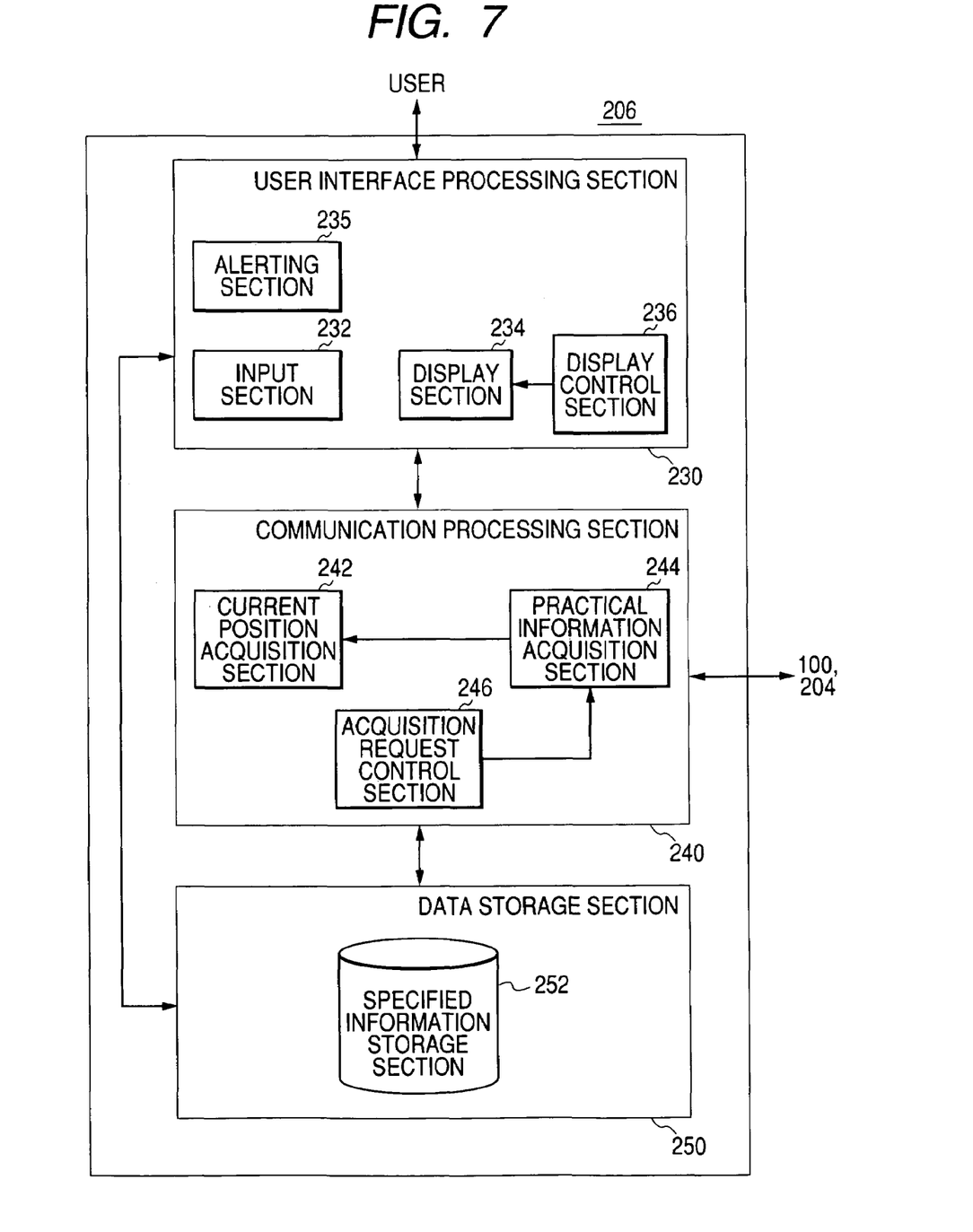
FIG. 7 is a functional block diagram of a mobile communication unit.

FIG. 7 is a functional block diagram of the mobile communication unit 206. The mobile communication unit 206 are implemented according to any desired combination of hardware and software including a CPU of a computer, memory, a program loaded into the memory, a storage unit such as a hard disk for storing the program, and a network connection interface. However, it is understood by those skilled in the art that various changes and modifications may be make in the implementation method and apparatus. The accompanying drawings show blocks by functional units rather than components by hardware units.

The mobile communication unit 206 includes a user interface processing section 230, a communication processing section 240, and a data storage section 250.

The user interface processing section 230 takes charge of an interface with the user. The user interface processing section 230 includes an input section 232, a display section 234, an alerting section 235, and a display control section 236. The input section 232 accepts operation by the user. The input section 232 accepts settings concerning the type of practical information, the time and location as the prerequisites to acquire information, the display mode of practical information, etc., as described above. The input section 232 further stores the setting information in a specified information storage section 252 included in the data storage section 250. The display section 234 displays the acquired information. The display control section 236 controls the display section 234 to display information on the basis of the setting concerning the display mode stored in the specified information storage section 252, which will be hereinafter called "display setting." The alerting section 235 is a device for alerting the user of the result of the acquired information, which is illustrated as a group of LEDs with four of them. The alerting section 235 may be vibrator or other device that is able to alert the user.

The communication processing section 240 performs processing concerning communications. The communication processing section 240 includes a current position acquisition section 242, a practical information acquisition section 244, and an acquisition request control section 246. The current position acquisition section 242 acquires the current position based on the base station ID of the base station 204 to which the mobile communication unit 206 connects. The current position acquisition section 242 may acquire the current position by way of the GPS (Global Positioning System). The practical information acquisition section 244 acquires the user's desired practical information through the base station 204 based on the setting information stored in the specified information storage section 252. The acquisition request control section 246 controls the timing at which the practical information acquisition section 244 acquires practical information. The acquisition request control section 246 includes a timer and instructs the practical information acquisition section 244 to acquire the user's desired practical; information at the intervals set by the user. The acquisition intervals may be set automatically.

The data storage section 250 includes the specified information storage section 252. Various setting information input through the input section 232 are stored in the specified information storage section 252. The communication processing section 240 and the user interface processing section 230 perform processing based on the setting information.

Figure 8:
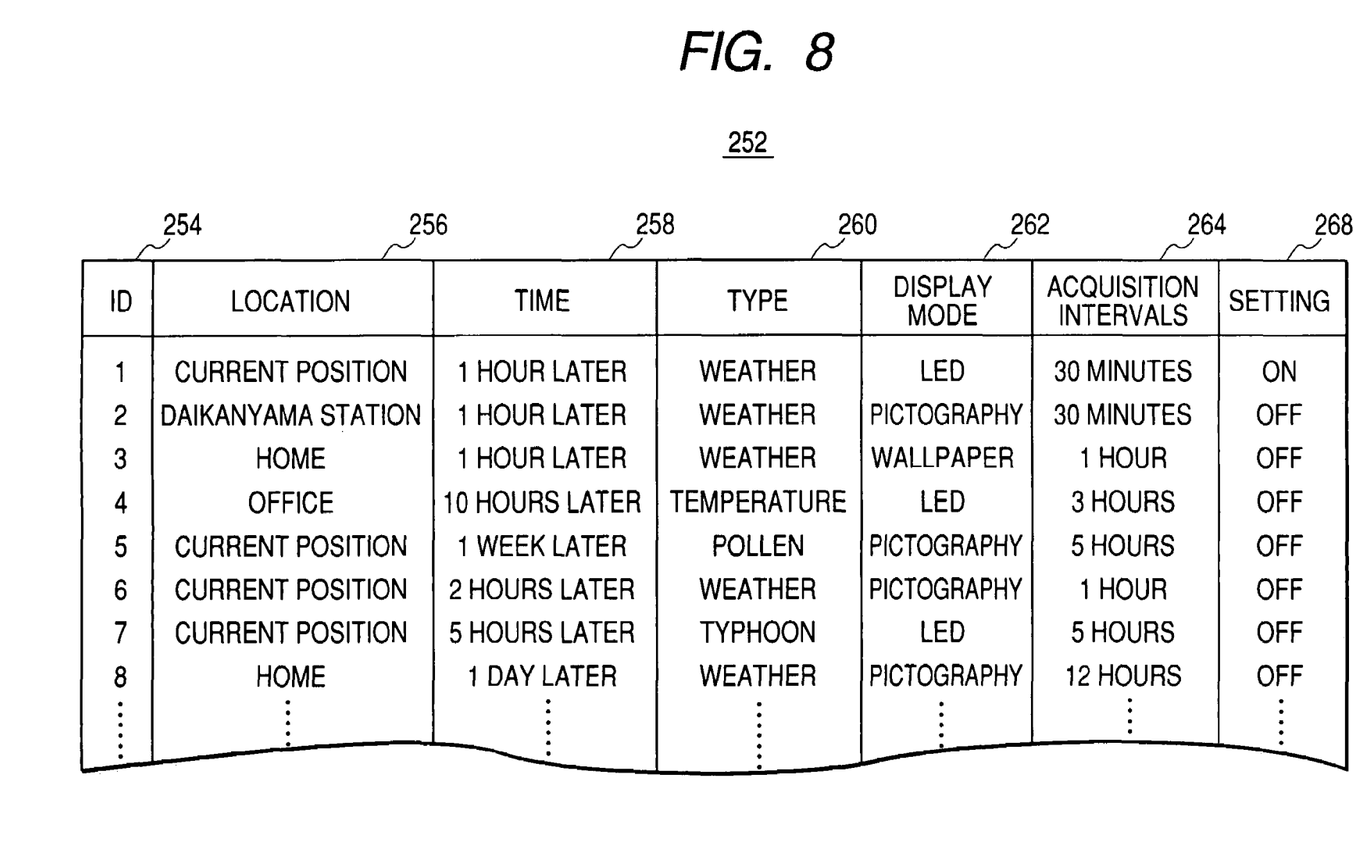
FIG. 8 is a drawing to show the data structure of a specified information storage section.

FIG. 8 is a drawing to show the data structure of the specified information storage section 252.

A setting ID column 254 lists the ID number to identify each setting. A location specification column 256 list setting concerning the location as the prerequisite to acquire practical information. The location may be selected from among previously registered locations or may be newly set by the user based on address data or map information. For example, in the setting of ID 2, a public location of "DAIKANYAMA STATION" is set. On the other hand, in the setting of ID 3, the location peculiar to the user, "HOME", is set. If "CURRENT POSITION" is set as in ID 1, the current position acquisition section 242 acquires the current position of the user.

A time specification column 258 lists setting concerning the time as the prerequisite to acquire practical information. A practical information type column 260 indicates the type of practical information, namely, contents. In the setting of ID 1, "WEATHER FORECAST INFORMATION" is set. In contrast, in the setting of ID 4, "TEMPERATURE PREDICTION INFORMATION" is set. A display mode specification column 262 lists setting concerning display of the acquired practical information.

An acquisition interval column 264 indicates the acquisition intervals at which the practical information acquisition section 244 acquires practical information. The acquisition request control section 246 instructs the practical information acquisition section 244 to acquire practical information each time the acquisition interval time has elapsed. A validity setting column 268 indicates whether or not the setting is validated. In FIG. 8, only the setting of ID 1 is validated. That is, the weather forecast information in one hour after the current position is displayed on LED. The practical information acquisition section 244 acquires the weather forecast information every 30 minutes. Here, the information is updated at 30-minute time intervals.

Figure 9:
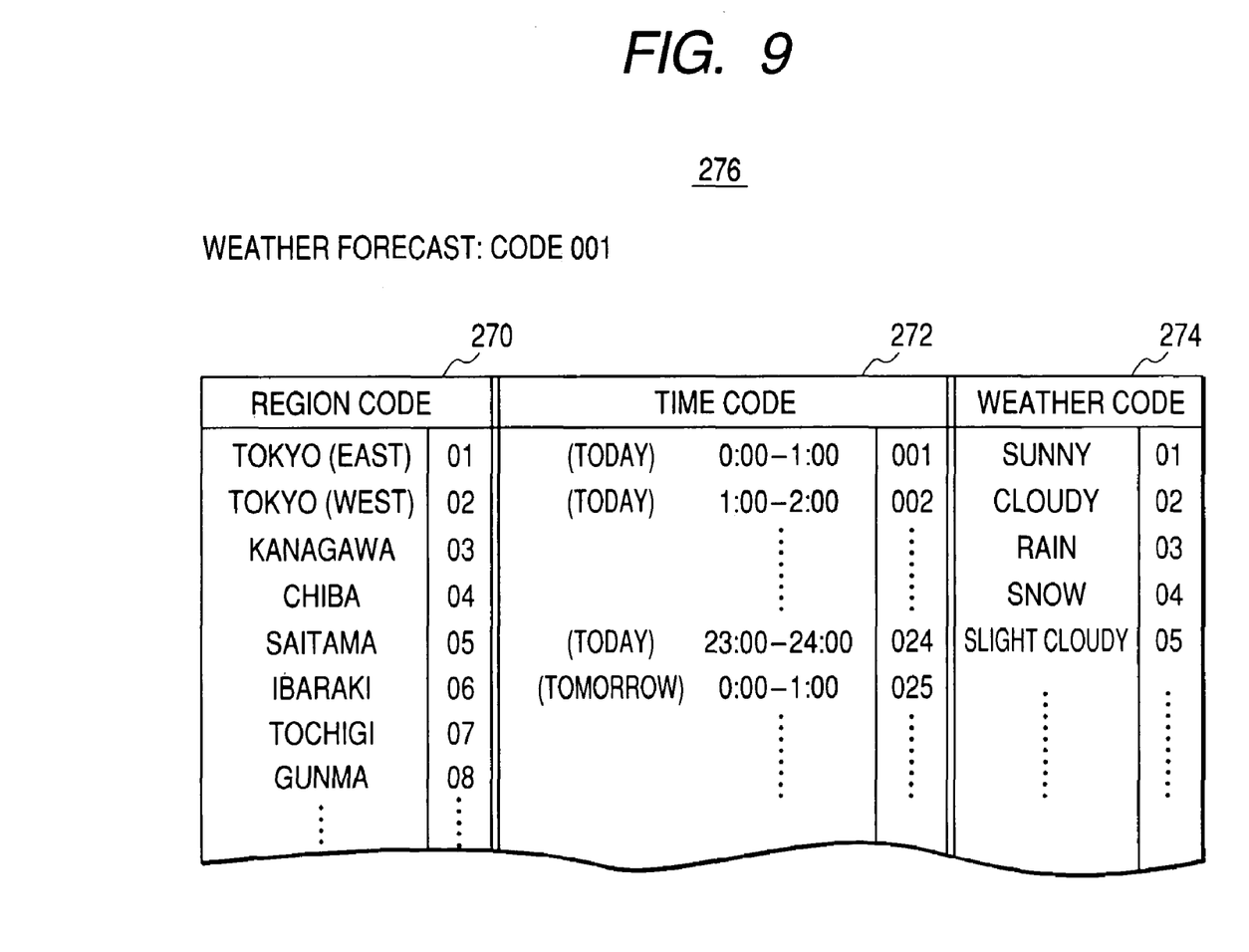
FIG. 9 is a drawing to show codes of practical information.

FIG. 9 shows weather forecast code 276 for weather forecast information. The portable telephone 210 acquires practical information based on the code of the weather forecast code 276. In FIG. 9, "001" is assigned as the type code of weather forecast information. A region code table 270 is a table of coded locations for the location specification column 256. A time code table 272 is a table of coded time zones for the time specification column 258, and a weather code table 274 is a table of coded weather forecast results. The codes are used in communication protocol for the portable telephone 210 to acquire practical information from the contents server 100. The practical information is coded based on the above codes and is transferred in form of an IP packet.

Figure 10:
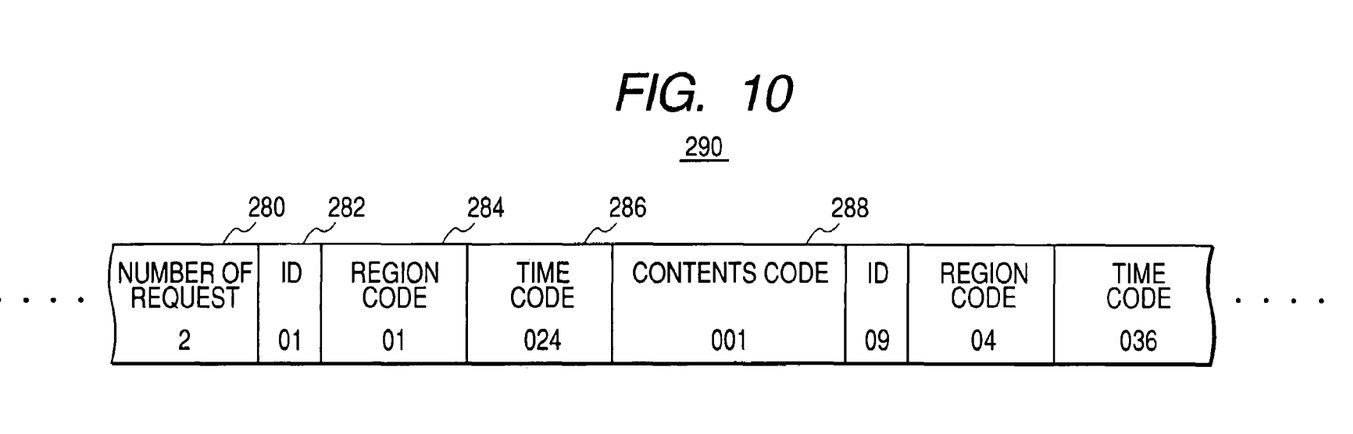
FIG. 10 is a drawing to show a data frame transmitted when a practical information request is made.

FIG. 10 shows an acquisition request data frame 290 transmitted when the practical information acquisition section 244 requests the contents server 100 to send practical information. A number-of-requests area 280 indicates the number of requests. A setting ID area 282 corresponds to the setting ID column 254. A region code area 284 indicates the location as the prerequisite to acquire practical information; "01" in the area corresponds to (EASTERN) TOKYO according to the region code table 270. That is, the practical information in (EASTERN) TOKYO is requested. A time code area 286 indicates the time as the prerequisite to acquire practical information; "024" in the area corresponds to (TODAY) 23:00–24:00 according to the time code table 272. A contents code area 288 indicates the type of practical information; "001" in the area corresponds to WEATHER FORECAST in FIG. 9.

Figure 11:
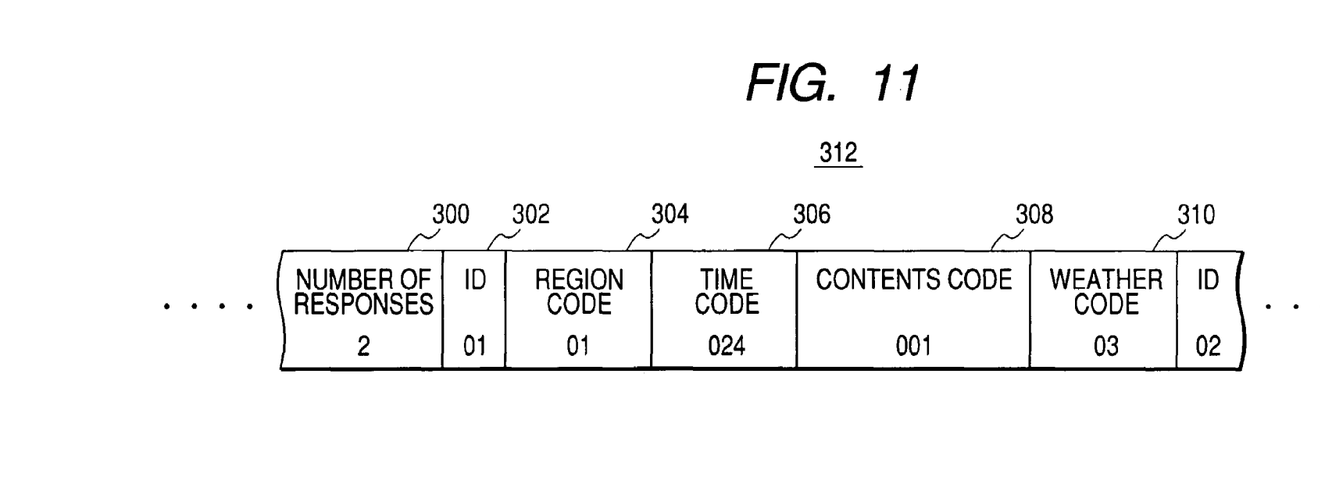
FIG. 11 is a drawing to show a data frame received when practical information is acquired.

FIG. 11 shows a response data frame 312 received when the practical information acquisition section 244 acquires practical information from the contents server 100. A number-of-responses area 300 indicates the number of responses. A setting ID area 302 corresponds to the setting ID column 254. A region code area 304 indicates the location as the prerequisite to acquire practical information; "01" is entered in the region code area 304 corresponding to "01" in the region code area 284. A time code area 306 indicates the time as the prerequisite to acquire practical information; "024" is entered in the time code area 306 corresponding to "024" in the time code area 286. A contents code area 308 indicates the type of practical information; "001" in the area corresponds to WEATHER FORECAST in FIG. 9. A weather code area 310 indicates the weather forecast result; "03" in the area indicates RAIN according to the weather code table 274.

Figure 12:
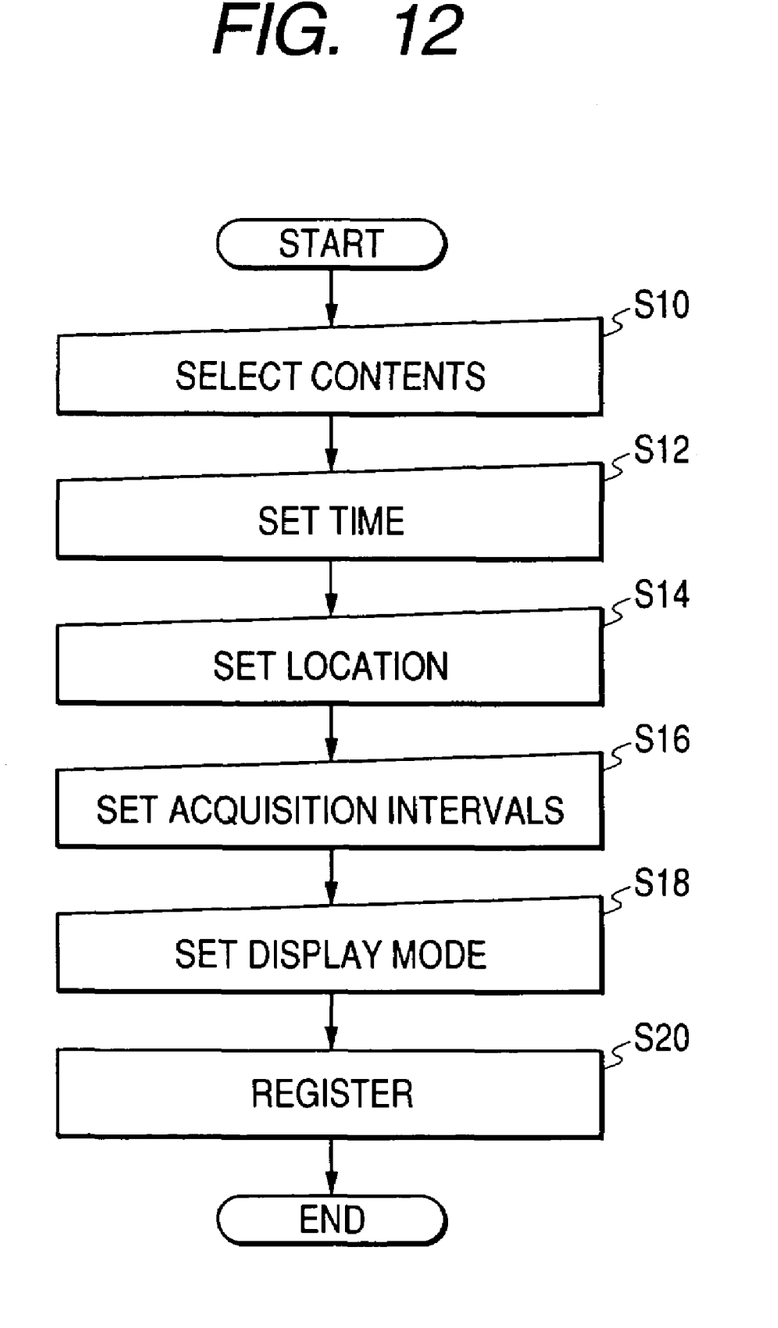
FIG. 12 is a flowchart to show the process in which settings for practical information are made.

FIG. 12 is a flowchart of the process in which the user sets practical information to be acquired. The user selects the practical information to be acquired on the practical information type setting screen 212 (S10). Next, the user sets the time as the prerequisite to acquire information in the time setting area 216 (S12), and sets the location as the prerequisite to acquire information in the location setting area 218 (S14). Then, the user sets the practical information acquisition intervals (S16). The user sets the practical information display mode (S18) and registers the settings in the specified information storage section 252 (S20).

Figure 13:
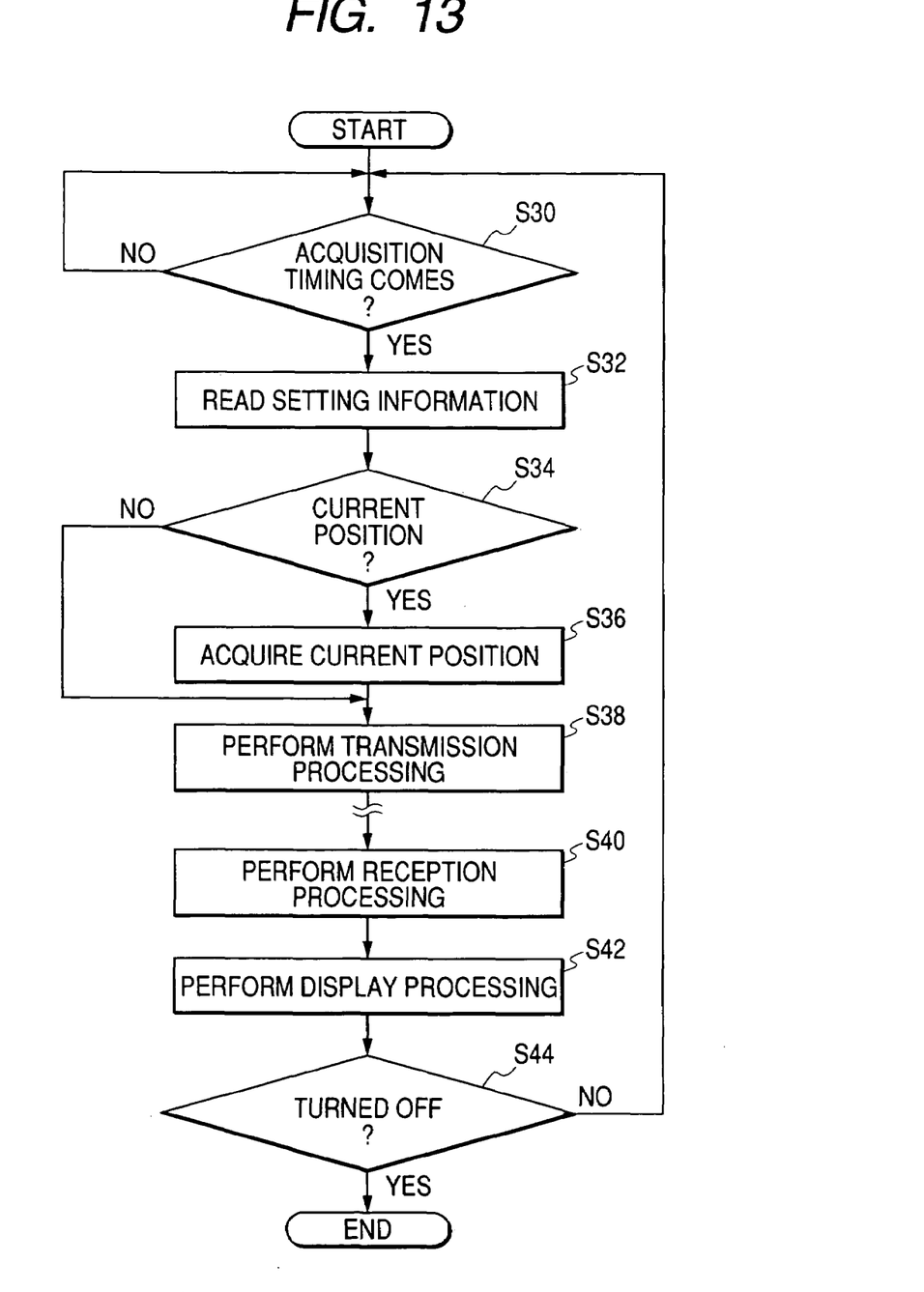
FIG. 13 is a flowchart to show the process in which practical information is acquired.

FIG. 13 is a flowchart of the process of acquiring practical information at regular time intervals when the portable telephone 210 is turned on. When the timing to acquire the practical information comes, the acquisition request control section 246 instructs the practical information acquisition section 244 to acquire the practical information (Y at S30). The practical information acquisition section 244 reads the setting information from the specified information storage section 252 in response to the instruction (S32). If the current position is set as the location as the prerequisite to acquire the practical information (Y at S34), the current position acquisition section 242 acquires the current position information (S36). The practical information acquisition section 244 transmits the acquisition request data frame 290 to the contents server 100 (S38) and acquires the response data frame 312 (S40). The display control section 236 causes the display section 234 to display the acquired practical information based on the setting in the display mode specification column 262 (S42). When the portable telephone 210 is turned off (Y at S44), the processing is terminated.

As describe above, in the embodiment, even if the user does not actively access the Internet, the user can acquire the user's desired information at regular time intervals. Most information is what the user does not aggressively want to acquire, but is just passively given. The embodiment enables the user to acquire such information simply by seeing the display section, so that efficient information transmission can be conducted. Particularly, the user can intuitively know the contents of the information by way of the pictographic display, etc. Further, the information may be able to be attached to a picture diary of electronic mail. As prediction information is acquired at regular time intervals, the user always acquires future information and thus can easily take action based on the prediction. Unlike mass information broadcast like news, the user can acquire practical information subdivided according to the user's concern, location, and time at regular time intervals.

The invention has been described based on the embodiment. It is understood by those skilled in the art that the embodiment is illustrative and that various changes and modifications may be made in the invention without departing from the spirit and scope thereof.

As one of the modifications, the information acquisition timing may be unperiodical. For example, the information acquisition frequency may be controlled so as to frequently acquire information during the day and to less frequently acquire information during the night. Also, the communication bill allowable per month may be specified by the user. The information acquisition frequency may be controlled so as to raise the acquisition frequency of practical information in a month in which the communication cost is low and to lower the acquisition frequency in a month in which the communication cost is large. The mobile communication unit 206 may have a notification section for alerting the user with vibration or sound etc., when a storm warning is issued or forecast of "sunny" changes to that of "rainy" in acquiring weather prediction information.

As the contents of practical information, the war situation, the state of infection of a disease, traffic congestion, and various pieces of prediction information such as power demand prediction, network communication load prediction, traffic congestion prediction, prediction concerning the ecology of animals and plants, etc., such as floating ice, migratory birds, and florescence of cherry blossoms, and astronomical prediction of a comet, an aurora, etc., are possible in addition to the weather information. As the time to be specified, a specific date and time rather than the elapsed time since the current time may be specified. If the practical information is numeric information such as the rainfall probability, the screen color or the action, gesture, etc., of a character displayed on wallpaper may change continuously according to the result. To specify the location as the prerequisite to acquire practical information, the user may be able to specify the position of another mobile communication unit. For example, when a child travels, if information can be received based on the location of the mobile communication unit of the child, the parent user can catch a glimpse of the circumstances at the child's location.

According to the embodiment, the user can effectively acquire necessary information with the mobile communication terminal 206.

What is claimed is:

1. A mobile communication unit comprising:
an input section which accepts operation by a user of the mobile communication unit;
a display section which displays predetermined information;
a specified information storage section which every setting stores a specified time specified through the input section and a specified location;
a practical information acquisition section which requests desired practical information based on the specified time and the specified location to a server storing practical information which varies on location and is updated with the lapse of time, so as to acquire the desired practical information;

an acquisition request control section which controls the practical information acquisition section to request the desired practical information at regular time intervals; and a display control section which controls the display section to display the desired practical information that the practical information acquisition section acquires.

2. The mobile communication unit according to claim 1, further comprising:

a current position acquisition section which acquires the current position of the mobile communication unit, wherein the specified information storage section stores the current position that the current position acquisition section acquires as the specified location.

3. The mobile communication unit according to claim 1, wherein the specified location is a position specified through the input section.

4. The mobile communication unit according to claim 1, wherein a specified information storage section stores type information representing contents type of practical information, and the practical information acquisition section requests desired practical information corresponding to the type information.

5. The mobile communication unit according to claim 1, wherein the specified information storage section stores display setting information representing a display mode of display the desired practical information every setting, and the display control section controls the display section to display the desired practical information according to the display mode information with reference to the specified information storage section.

6. The mobile communication unit according to claim 1, wherein the acquisition request control section controls to change the regular time interval according to whether it is in daytime or nighttime.

7. The mobile communication unit according to claim 1, wherein the display control section controls the display section to change an aspect of what is displayed according to a result of an acquired practical information.

8. The mobile communication unit according to claim 1, wherein the display control section controls the display section to change an aspect of what is displayed when contents of an acquired practical information changes from contents of practical information acquired at a previous time interval.

9. The mobile communication unit according to claim 1, further comprising:

an alerting section which alerts a user of the mobile communication unit to a result of an acquired practical information.

10. The mobile communication unit according to claim 1, further comprising:

an alerting section which alerts a user of the mobile communication unit when contents of an acquired practical information changes from contents of practical information acquired at a previous time interval.

11. A communication system, comprising;

a mobile communication unit in a mobile communication network; and a contents server connected to the mobile communication network, which stores practical information which varies on location and is updated with the lapse of time, wherein the mobile communication unit requests at regular time intervals to the contents server desired practical information based on a specified time and a specified location, the contents server transmits the desired practical information in response to the request by the mobile communication unit, and the mobile communication unit displays the desired practical information transmitted by the contents server.

12. A method of acquiring desired practical information from a contents server to a mobile communication unit in a mobile communication network, comprising the steps of:

storing in the contents server practical information which varies on location and is updated with the lapse of time;

requesting from the mobile communication unit to the contents server desired practical information based on a specified time and a specified location;

transmitting from the contents server to the mobile communication unit the desired information in response to the request from the mobile communication unit; and displaying in the mobile communication unit the desired practical information transmitted from the contents server.

* * * * *